E. RICE.

Trowel Bayonets.

No. 6,083. Reissued Oct. 13, 1874.

Witnesses
Frank G. Parker.
Geo. W. Bancroft

Inventor.
Edmund Rice
per J. L. G. Rice
Atty.

THE GRAPHIC CO. PHOTO-LITH. 39 & 41 PARK PLACE, N.Y.

UNITED STATES PATENT OFFICE.

EDMUND RICE, OF THE UNITED STATES ARMY.

IMPROVEMENT IN TROWEL-BAYONETS.

Specification forming part of Letters Patent No. 91,564, dated June 22, 1869; reissue No. 6,083, dated October 13, 1874; application filed September 1, 1874.

*To all whom it may concern:*

Be it known that I, Col. EDMUND RICE, of the United States Army, have invented a Trowel-Bayonet, of which the following is a specification:

The object of my invention is to make an implement in which shall be combined a bayonet for the ordinary purposes of attack and defense, and also a trowel for the purpose of throwing up earth, so that hasty field-intrenchments may be made.

Figure 1:
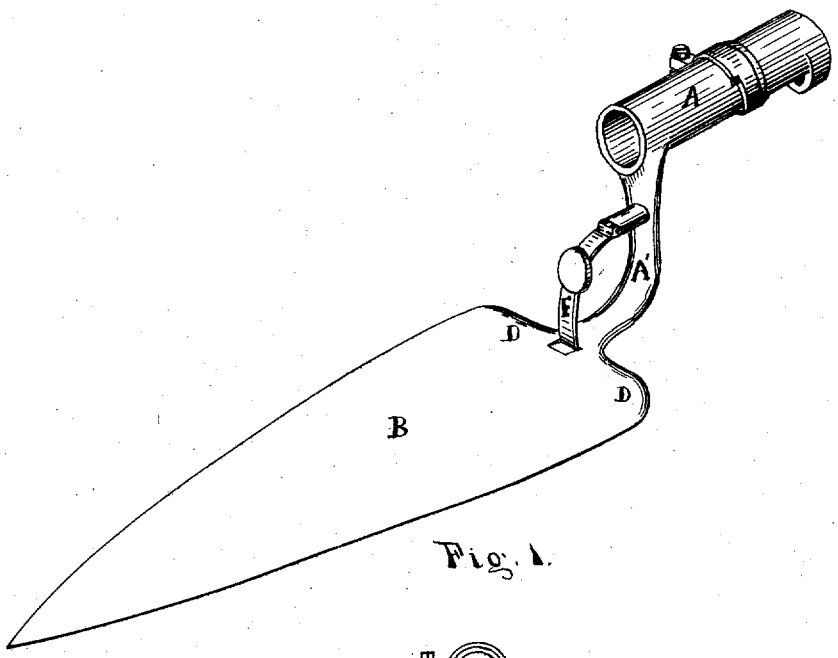
Figure 3:
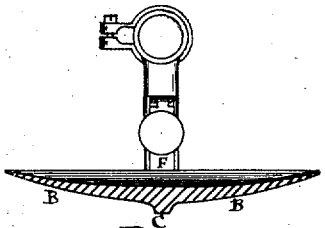
Figure 2:
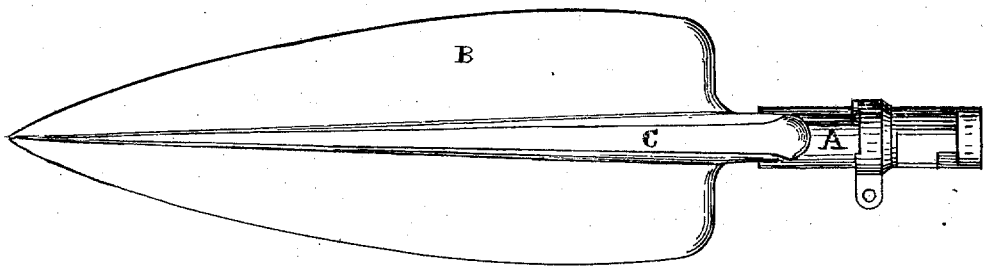

In the drawings, Figure 1 is a front view of a trowel-bayonet of my invention; Fig. 2, a rear view of the same; and Fig. 3, a sectional view.

A is the socket of the bayonet. A′ is the shank. B is the blade of the trowel and bayonet combined. C is a rib on the back, to give additional strength. D D are flanges, turned on the lower part of the blade, to prevent the hands of the soldier from being cut. F is a finger-guard or loop, the object of this being for the soldier to place his forefinger through while he is digging—as the bayonet is to dig with when it is off the gun—the soldier kneeling down and throwing up earth, with the bayonet grasped in his right hand.

It is found best to make the inside of the blade of the bayonet scooped or concave, so that it will better hold the earth.

It is well known that the ordinary bayonet, as at present constructed, is of very little practical service in warfare, on account of the rapidity and accuracy of the breech-loading rifles now commonly used; and the improved artillery, Gatling guns, and mitrailleuses so generally adopted by all civilized nations, make a bayonet-charge a thing of the past, as the advancing party would be annihilated before an opportunity was given them to actually cross bayonets. It is also well known that by throwing up an earthwork of a very few inches in height, and especially by excavating in the earth ditches of just sufficient depth to allow the men to lie on their faces or backs, and not be above the level of the ground in which the ditches are dug, troops may remain a long time exposed to the enemy's fire without serious loss, as the shot will be thrown over them, or, striking the earth in front, ricochet over them. These earthworks may be thrown up, or the ditches dug, in a very few minutes—in less time than will be required by the enemy to get the range of the troops—if each man is provided with a small spade or trowel to be used for that purpose.

By means of my invention each soldier is provided with the indispensable intrenching-tool and the needed weapon without being obliged to carry any extra weight, as the trowel-bayonet may be made so as not to exceed in weight the clumsy saber-bayonet or the long heavy triangular bayonet.

This bayonet may be made by any of the ordinary modes used during the past few years of making bayonets, such as by forging it in a single piece, or by making it in separate pieces and welding or riveting the parts together.

In addition to the advantages of the combined tool and weapon, this bayonet also may serve as a shield to the abdomen by being worn upon it when the soldier is in action. Or it may be worn in any convenient way and also serve as a shield, as, from its width, it would protect a large surface of the body, the width of the bayonet now used by the United States troops being three inches, and the length ten inches. The point of the bayonet is made sharp, the edges at the sides made about the sharpness of a cavalry-saber, so that the bayonet can be used in piercing and cutting.

I claim as my invention—

An implement, made with a wide tapering blade, analogous to that of a mason's or gardener's trowel, adapted to be detachably connected with the muzzle of a gun and to be used either as a bayonet or as an intrenching-tool.

EDMUND RICE.

Witnesses:

ISRAEL L. G. RICE,
CHARLES C. LIVERMORE.